United States Patent [19]

Eykamp

[11] 4,246,741
[45] Jan. 27, 1981

[54] IMPLEMENT FOR GATHERING HAY, WINDROWED CROPS AND OTHER STREWN MATERIAL

[76] Inventor: Roy D. Eykamp, "Medway", Quirindi, New South Wales 2343, Australia

[21] Appl. No.: 12,080

[22] Filed: Feb. 14, 1979

[51] Int. Cl.³ .............. A01D 50/00; A01D 65/02; A01D 77/08
[52] U.S. Cl. ............................ 56/13.2; 56/12.7; 56/294
[58] Field of Search .............. 56/12.7, 13.2, 364, 56/14.4, 126, 294

[56] References Cited

U.S. PATENT DOCUMENTS

| | | | |
|---|---|---|---|
| 2,817,945 | 12/1957 | McClellan | 56/364 |
| 2,871,643 | 2/1959 | McClellan | 56/364 |
| 3,176,995 | 4/1965 | Ferris | 56/294 |
| 3,212,247 | 10/1965 | Erickson | 56/126 |
| 3,295,302 | 1/1967 | Lee | 56/12.7 |
| 3,429,061 | 2/1969 | Haban | 56/12.7 |
| 3,849,824 | 11/1974 | Dorring | 56/364 |
| 4,060,961 | 12/1977 | Anderson | 56/294 |

*Primary Examiner*—Paul J. Hirsch
*Attorney, Agent, or Firm*—Stevens, Davis, Miller & Mosher

[57] ABSTRACT

To pick up crop or other strewn materials from ground or other level, a bladed rotor is travelled closely over the materials so as to flick them into a carrier bin, a conveyor chute or the like. The rotor blades are of pliant sheet material each fixed by one longitudinal edge to a rotor shaft so as to be able to extend radially from the shaft, under centrifugal force, when the shaft is rapidly rotated; the back or trailing faces of the distal edge marginal portions of the blades are eccentrically weighted so that, upon rotation, the margins are centrifugally induced to incline angularly in the direction of blade rotation so to exercise a spooning or up-scooping action on the matters to be picked up.

4 Claims, 7 Drawing Figures

U.S. Patent
Jan. 27, 1981
4,246,741
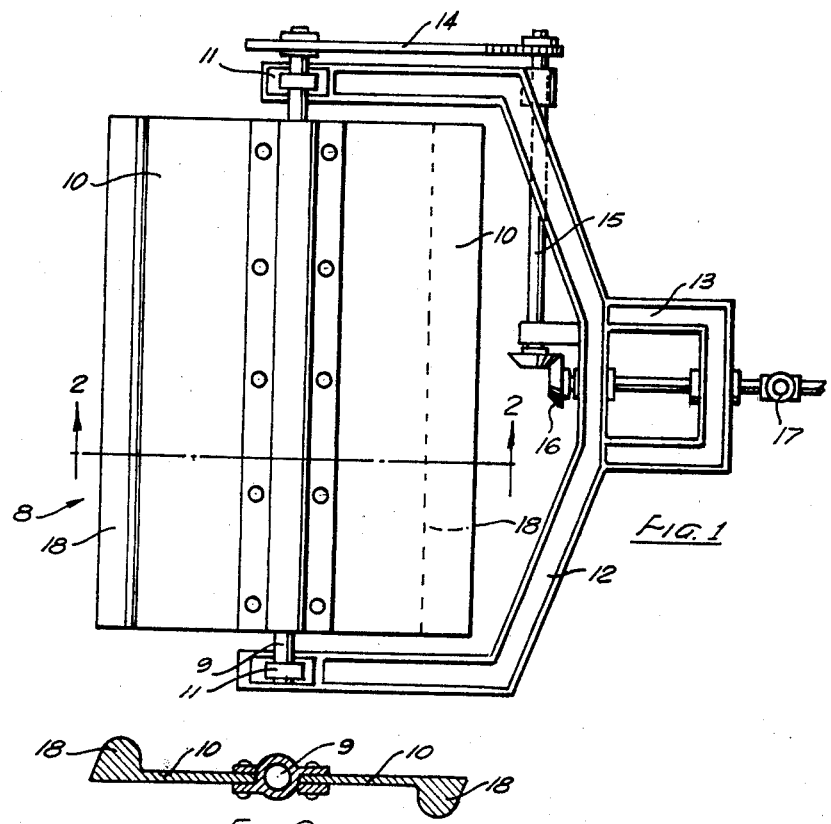
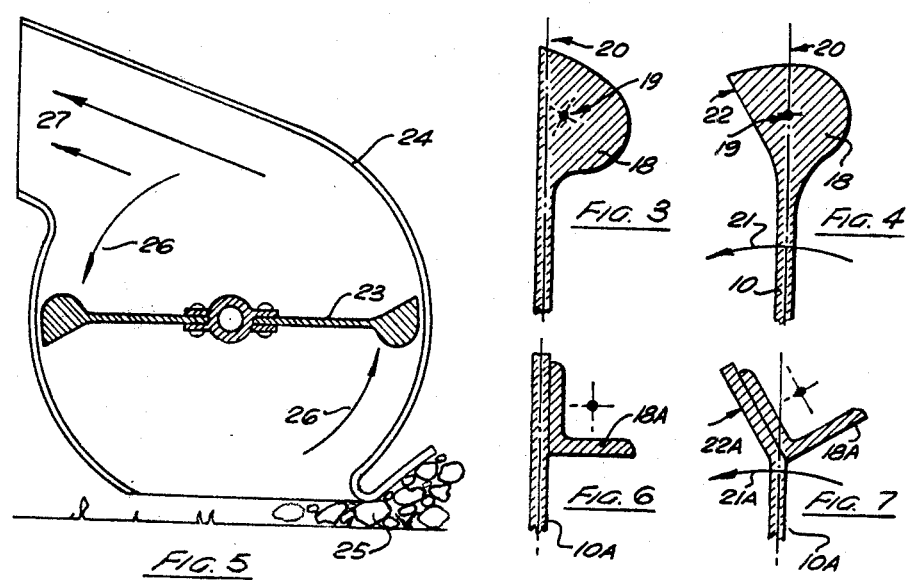

IMPLEMENT FOR GATHERING HAY, WINDROWED CROPS AND OTHER STREWN MATERIAL

This invention relates to implements for picking up discrete materials, strewn or disposed in orderly manner or randomly, at ground, floor or other level.

Thus, the invention may be employed in a carpet sweeping machine, in a street sweeping machine, for gathering hay whether windrowed or randomly disposed on the ground, for gathering dug potatoes from the ground surface, and experiment has shown that it may also be usefully employed as a grass mower and clippings gatherer.

Although the invention subject hereof is usefully applicable with the generality just indicated, it is primarily intended for use in the picking up of seed or other crop materials which are vulnerable to mechanical damage when impactually picked up and then flung some considerable distance into a receiver bin or the like. Because of this the invention is described herein mainly in terms of two embodiments of the invention for use in the primarily intended manner indicated.

It is well known to pick up materials and impel them into a required location by use of rotors equipped with rigid pick-up blades or battens of timber, sheet metal or the like, and it is also well-known to provide such rigid blades with a distal edge margin which is angularly offset relative to the general plane of the blade, so to project forwardly in the direction in which the blades or battens rotate. This provision of a forwardly inclined distal edge portion means that when the crop is picked up from the ground, it is picked up with what may be called a spooning or up-scooping action so that each particle of the crop bouncing off the blade is re-directed with a component of upward motion, thus to ensure that the picked up particle is simply not bounced back to the general level from which it came when it was first hit by the gathering blade.

Rigid pick-up blades of the kind just discussed are quite effective when the matters to be picked up are not vulnerable to mechanical damage, or it does not matter if they should be damaged. The present invention, however, goes beyond this by imparting to the picked up particles the required elevatory spooning action while at the same time contacting the crop particles during the course of pick up entirely by yielding surfaces composed wholly of pliant material.

Thus, the object of the present invention is to provide a pick-up or gathering implement incorporating rotor, the blades of which are of such pliancy that they stand radially erect from the shaft on which they are mounted and have forwardly inclining distal edge margins established entirely by the centrifugal force engendered upon rapid rotation of the rotor.

The invention provides a gathering implement comprising:

(a) a rotor cnsisting of a central drive shaft and a plurality of pliant aprons each attached by one side edge to and longitudinally of said shaft, (b) means to support said rotor and travel it so that the distal longitudinal marginal portions of said aprons sweep into the material to be gathered;

(c) means to rotate said rotor while it is being travelled as aforesaid; and, (d) on each of said marginal portions a weighting element which extends longitudinally of its marginal portions, is secured eccentrically to the rear, non-gathering face of said portion; and, upon rotation of said rotor, centrifugally causes said margin to become angled relative to the remainder of its apron and projected towards the direction in which said apron is turning thereby to form an up-scooping distal edge portion on said apron.

Two examples of the invention are shown in the drawings herewith. The drawings are largely schematic in illustrating general construction rather than specifically designed embodiments of the invention.

FIG. 1 is a plan of a gathering implement adapted to be mounted on the three-point linkage of a common tractor and to be driven by a normal power take-off from the gear box of such a vehicle.

FIG. 2 is an end view of the rotor shown in FIG. 1 taken along the line 2—2 in FIG. 1.

FIG. 3 is a section through a distal edge margin of a pick-up apron when not subjected to centrifugal force.

FIG. 4 repeats FIG. 3 except for showing the distal margin under the influence of centrifugal force.

FIG. 5 shows an end view of a collector trunk within which a rotor of the kind shown in the previous figures may be employed.

FIGS. 6 and 7 are views respectively similar to FIGS. 3 and 4 of an alternative embodiment of a weighted apron.

Referring to FIGS. 1 to 4, a rotor 8 consists of a central drive shaft 9 and a plurality of pliant aprons 10. Each of the aprons is attached by one of its longitudinal side edges to and along shaft 9, and, in the illustrated embodiment, this shaft is mounted in bearings 11 mounted on a frame member 12 equipped with usual support end arrangements indicated 13 for mounting and raising and lowering an implement in coventional manner on the three-point suspension mechanism of a tractor. Means to rotate the rotor may consist of a sprocket drive 14 leading to shaft 9 by way of countershaft 15, bevel gears 16 and universally jointed telescopic drive shaft indicated at 17.

Each of the pliant aprons 10 is furnished with a weighting bead or rib 18 secured to the apron by being integral therewith or separately formed and applied thereto. These ribs 18 are so disposed that their centres of gravity indicated at 19 are eccentric relative to the general plane of a radially out-spread apron as represented by line 10 in FIGS. 3 and 4. When the rotor is quiescent, the pliant aprons simply drape from the shaft, but when the shaft is rotated at sufficient speed, the aprons assume radial disposition relative to the shaft and the bead centre of gravity 19 approaches the plane indicated at 20, so that in the forward rotary movement of the rotor as indicated by arrow 21, the apron becomes possessed of a forwardly inclined distal edge marginal surface as indicated at 22.

A rotor such as that described may be simply used without accompaniment in the sense that it may be employed to pick up matters from ground level and fling them directly into a nearby receptacle vehicle or the like. On the other hand, such a rotor as that already described is indicated at 23 in FIG. 5 where the rotor operates inside a trunk or casing 24 and is fed into the matters to be picked up as indicated at 25, rotated in the direction indicated by arrow 26 and the picked up material flung through a chute 27 for disposal in any convenient manner.

Referring to FIGS. 6 and 7, the principle just described applies equally, in that a pliant apron 10A has a weighting bead 18A fixed to the distal marginal portion of the apron so that when the apron is quiescent as shown in FIG. 6, it is devoid of a forwardly bent leading edge, and when it is rotated rapidly in the direction indicated by arrow 21A, the centre of gravity of the weighted rib advances towards the plane of the apron thus giving a forwardly inclined up-scooping edge surface 22A.

I claim:

1. A gathering implement comprising:
   (a) a rotor consisting of a central drive shaft and a plurality of aprons of pliant sheet material, each attached by one side edge to and longitudinally of said shaft;
   (b) means to support said rotor and travel it so that the distal longitudinal marginal portions of said aprons sweep into the material to be gathered;
   (c) means to rotate said rotor while it is being travelled as aforesaid; and
   (d) on each of said marginal portions a weighting element which extends longitudinally of its marginal portion, is secured eccentrically to the rear, non-gathering face of said portion; and, upon rotation of said rotor, causes said marginal portions due to centrifugal force, to become angled relative to the remainder of its apron and projected towards the direction in which said apron is turning, thereby to form an up-scooping distal edge portion on said apron.

2. An implement according to claim 1 wherein said aprons and the weighting element thereon are integral.

3. An implement according to claim 1 wherein said weighting elements are separately formed relative to said aprons, the former being fixedly secured to the latter.

4. A flail member for a rotary gathering or mowing implement incorporating a shaft and means to rotate it, said member comprising:
   (a) an apron of pliant sheet material having a proximal edge fixedly secured to and longitudinally of said shaft; and
   (b) a weighting element which extends along and is eccentrically secured to the distal edge margin of said apron on the trailing face of said margin so that upon rotation of said shaft sufficient for centrifugal out-flinging of said element, said apron bends in the vicinity of said margin to become angled relative to the remainder of said apron and projected towards the direction in which said shaft is turning.

* * * * *